(12) United States Patent
Shinada et al.

(10) Patent No.: US 7,434,558 B2
(45) Date of Patent: Oct. 14, 2008

(54) INTAKE APPARATUS AND INTAKE MANIFOLD FOR INTERNAL COMBUSTION ENGINE

(75) Inventors: Masashi Shinada, Saitama (JP); Yuichi Hikita, Saitama (JP)

(73) Assignee: Mahle Filter Systems Japan Corporation, Tokyo (JP)

( * ) Notice: Subject to any disclaimer, the term of this patent is extended or adjusted under 35 U.S.C. 154(b) by 0 days.

(21) Appl. No.: 11/669,578

(22) Filed: Jan. 31, 2007

(65) Prior Publication Data

US 2007/0199535 A1    Aug. 30, 2007

(30) Foreign Application Priority Data

Feb. 27, 2006 (JP) .............................. 2006-049607

(51) Int. Cl.
    *F02M 35/10* (2006.01)
(52) U.S. Cl. .............................. 123/184.47; 123/184.53
(58) Field of Classification Search ............ 123/184.53, 123/184.57, 184.21, 184.47
    See application file for complete search history.

(56) References Cited

U.S. PATENT DOCUMENTS 5,377,629 A    1/1995  Brackett et al.
5,809,961 A *  9/1998  Morota et al. .......... 123/184.53

FOREIGN PATENT DOCUMENTS

| EP | 0 376 299 A1 | 7/1990 |
| EP | 1 085 201 A2 | 3/2001 |
| JP | 11-13500 A   | 1/1999 |
| JP | 11-141416 A  | 5/1999 |
| JP | 2002-155817 A | 5/2002 |

* cited by examiner

*Primary Examiner*—Noah Kamen
(74) *Attorney, Agent, or Firm*—Foley & Lardner LLP

(57) ABSTRACT

An intake apparatus for an internal combustion engine, includes a passage section defining an intake passage; and a throttle valve located in the intake passage, the throttle valve including a rotation shaft, and a plate-shaped valve element arranged to rotate about the rotation shaft, and having a first end and a second end, the throttle valve being opened so that the first end is moved in a downstream direction of the intake passage, and that the second end is moved in an upstream direction of the intake passage. The passage section includes a circumferential wall formed with an expansion chamber recessed radially outwards, the expansion chamber extending partially circumferentially, and being located at a longitudinal position that is downstream of the throttle valve, and that intake air flows passing through the first and second ends of the valve element flow into each other.

4 Claims, 4 Drawing Sheets

| | | SOUND PRESSURE DIFFERENCE | L | θ | V |
|---|---|---|---|---|---|
| COMPARATIVE EXAMPLE 1 | 3, 4, 3 / 7, 7 | +0.5dBA | 60mm | 45deg | 15cc |
| EXAMPLE | | -3.4dBA | 80mm | ↑ | ↑ |
| COMPARATIVE EXAMPLE 2 | | -1.7dBA | 100mm | ↑ | ↑ |
| COMPARATIVE EXAMPLE 3 | | +0.0dBA | 80mm | 90deg | ↑ |
| COMPARATIVE EXAMPLE 4 | | +1.4dBA | 80mm | 0deg | ↑ |
| COMPARATIVE EXAMPLE 5 | | -2.9dBA | 80mm | 45deg | 5cc |
| COMPARATIVE EXAMPLE 6 | | -3.2dBA | ↑ | ↑ | 30cc |

US 7,434,558 B2

INTAKE APPARATUS AND INTAKE MANIFOLD FOR INTERNAL COMBUSTION ENGINE

BACKGROUND OF THE INVENTION

This invention relates to an intake apparatus and an intake manifold for an internal combustion engine provided with a throttle valve, and more specifically to decreasing an abnormal noise when the throttle valve is rapidly opened.

In an internal combustion engine provided with a throttle valve, when the throttle valve is suddenly opened, a noise of an air flow is generated. Particularly in a case in which an intake manifold is made from a synthetic resin, the noise is further increased.

A patent document 1 (Japanese Patent Provisional Publication No. H11(1999)-013500), a patent document 2 (Japanese Patent Provisional Publication No. H11(1999)-141416), and a patent document 3 (Japanese Patent Provisional Publication No. 2002-155817) disclose an intake apparatus provided with a grid-shaped rectifier member (wire netting member) for rectifying the flow immediately downstream of the throttle valve, and an intake apparatus provided with a raised portion (projection) immediately downstream of the throttle valve to generate turbulence positively, for reducing the noise caused by the joining of the flows passing through the throttle valve.

SUMMARY OF THE INVENTION

However, in these conventional noise reduction apparatuses, the loss of the pressure (pressure loss) is increased. Resistance of air flow tends to be increased as the effect of the reduction of the noise is increased. For example, in a case in which a lattice (grid)-shaped rectifier member is provided all over the intake passage, it is possible to attain the relatively large effect of the reduction of the noise. However, the resistance of the air flow is increased. That is, the effect of the reduction of the noise and the resistance of the air flow are in relationship of tradeoff. In the conventional noise reduction apparatuses, it is not possible to attain the reduction of the noise without increasing the resistance of the air flow.

Moreover, in a case in which an intake manifold is made from a synthetic resin, the grid-shaped rectifier member of the conventional noise reduction device can not integrally formed with a main part of the intake manifold by molding. Necessarily, the grid-shaped rectifier member and the intake manifold are different members, and consequently it causes the increase of the number of the components and the increase of complication of production process.

It is an object of the present invention to provide an intake apparatus and an intake manifold for an internal combustion engine which are aimed to solve the above-mentioned problem.

According to one aspect of the present invention, an intake apparatus for an internal combustion engine, comprises: a passage section defining an intake passage; and a throttle valve located in the intake passage, the throttle valve including a rotation shaft, and a plate-shaped valve element arranged to rotate about the rotation shaft, and having a first end and a second end, the throttle valve being opened so that the first end of the valve element is moved in a downstream direction of the intake passage, and that the second end of the valve element is moved in an upstream direction of the intake passage, the passage section including a circumferential wall formed with an expansion chamber recessed radially outwards, the expansion chamber extending partially circumferentially, and being located at a longitudinal position that is downstream of the throttle valve, and that intake air flows passing through the first and second ends of the valve element flow into each other.

According to another aspect of the invention, an intake manifold made from a synthetic resin for an internal combustion engine, the intake manifold comprises: a is collector portion connected with a plurality of branch portions; a throttle chamber mounting flange to which a throttle chamber provided with a throttle valve is mounted; and a cylindrical passage portion connecting the throttle chamber mounting portion and the collector portion, and including a circumferential wall having an expansion chamber extending partially circumferentially, the expansion chamber being integrally formed with the passage portion, and recessed radially outwards.

DETAILED DESCRIPTION OF THE INVENTION

Hereinafter, embodiments of the present invention will be illustrated with reference to diagrams.

Figure 1:
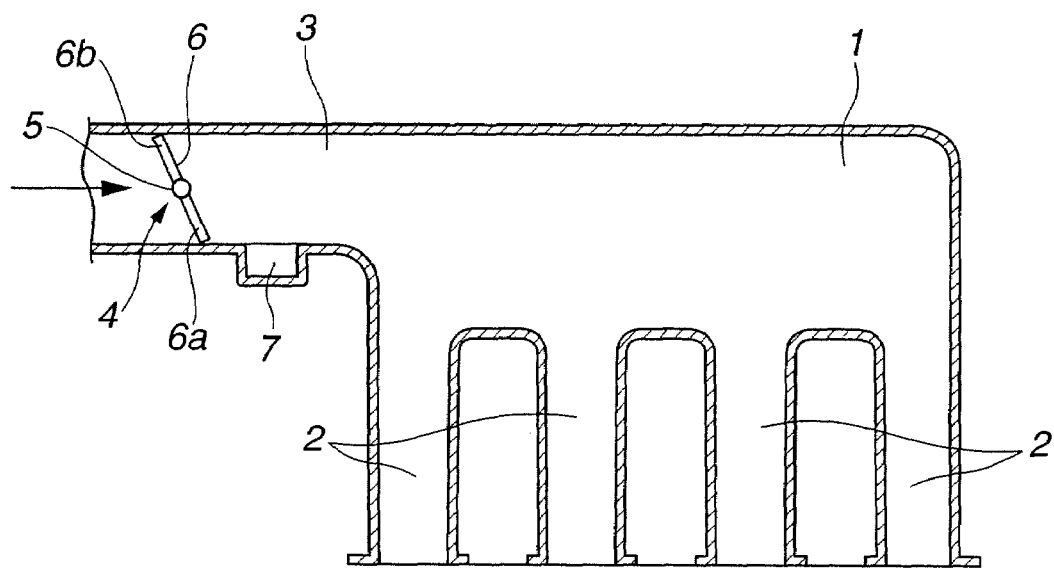
FIG. 1 is a view for illustrating a structure of an intake apparatus according to a first embodiment of the present invention.

FIG. 1 is a schematic view for illustrating a structure of an intake apparatus of an internal combustion engine (for example, an inline four-cylinder gasoline engine). A volume chamber or collector portion 1 is connected with four branch portions 2 connected with each cylinder. Collector portion 1 is connected with an inlet passage 3 constituting part of an intake passage. Inlet passage 3 includes a cylindrical portion having a circular section. A throttle valve 4 is disposed in the cylindrical portion of inlet passage 3. Throttle valve 4 has a structure of a general butterfly valve. Throttle valve 4 includes a rotation shaft 5 extending in a diametrical direction of inlet passage 3 to pass across a center of inlet passage 3, and a disc-shaped valve element 6 having a first end 6a and a second end 6b, and fixed to rotation shaft 5. Throttle valve 4 is driven to be opened or closed through an electromotive actuator (not shown) and accelerator wires (not shown). Besides, an air cleaner (not shown) is disposed on an upstream side of throttle valve 4.

When throttle valve 4 is located at a fully closed position, first end 6a of valve element 6 is located at a downstream position, and second end 6b of valve element 6 is located at an upstream position which is upstream of the downstream position of first end 6a of valve element 6. Consequently, throttle valve 4 is slightly inclined at the fully closed position. When throttle valve 4 is opened, first end 6a of valve element 6 is moved further downstream from the fully closed position, and second end 6b of valve element 6 is moved further upstream from the fully closed position.

In the embodiment of the present invention, there is provided an expansion chamber 7 located, in an inner circumferential surface of inlet passage 3, at a position slightly downstream of throttle valve 4, and formed in part of the circumferential surface of inlet passage 3 to be recessed in a radial direction. By this expansion chamber 7, the local pressure increase when throttle valve 4 is suddenly opened is decreased, and the accordingly the noise of the air flow is restricted. In the embodiment of the present invention, expansion chamber 7 is in the form of a rectangular recessed portion, and however it is optional to employ a simple rectangular shape, a cylindrical shape and so on.

Next, the position of expansion chamber 7 will be illustrated.

Figure 2:
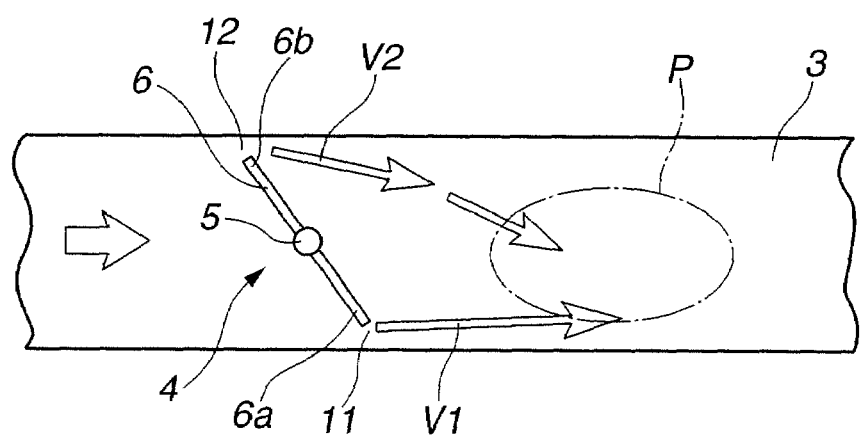
FIG. 2 is a view for illustrating a local pressure increase when a throttle valve is opened.

FIG. 2 is a view for illustrating a local pressure increase to cause the noise of the air flow when throttle valve 4 is opened. When throttle valve 4 is closed, a negative pressure is generated in collector portion 1. In a case in which throttle valve 4 is suddenly opened from the fully closed position that the negative pressure is generated in collector portion 1, a fast intake air flow V1 flows through a clearance 11 at first end 6a of valve element 6, and a fast intake air flow V2 flows through a clearance 12 at second end 6b of valve element 6. Air flows V1 and V2 flow intricately into each other on the downstream side of throttle valve 4, and consequently the local pressure increase is generated in a region P. In particular, for the inclination of valve element 6, the speed of the air flow in clearance 11 and the speed of the air flow in interspace 12 are different from each other, and the position of the air flow in clearance 11 and the position of the air flow in clearance 12 are different from each other in the upstream and downstream directions. Consequently, as shown in FIG. 2, region P is not located at a position of a height of a central line of the intake passage (that is, position of the height corresponding to rotation shaft 5), and located in a position which is below the position of the height of the central line of the intake passage, and which is nearer to first end 6a than to second end 6b. In this example, it is necessary that expansion chamber 7 is located in the vicinity of region P. Therefore, expansion chamber 7 is located at a longitudinal position that intake flows V1 and V2 flow into each other (join together), for example, at a position which is apart from rotation shaft 5 in the downstream direction by a few centimeters. Moreover, in the section of the intake passage, expansion chamber 7 is located at a position which is inclined at 45 degrees to rotation shaft 5 from the center of the intake passage. In particular, expansion chamber 7 is located at the position which is inclined at 45 degrees to rotation shaft 5, on the first end 6a's side that first end 6a is moved in the downstream direction at the open operation of throttle valve 4. In this way, expansion chamber 7 is provided at the appropriate position corresponding to region P in which the local pressure increase is caused. Accordingly, the pressure energy is diffused, and the noise is decreased. Expansion chamber 7 according to the embodiment of the present invention does not narrow cross section of the intake passage, and does not causes the resistance of the flow, unlike the conventional grid-shaped rectifier member. Accordingly, it is possible to attain the reduction of the noise of the air flow without increasing the resistance of the air flow. As described below, in a case in which expansion chamber 7 is located at an inappropriate position, conversely the noise may be increased.

Figures 3, 4A, 4B:
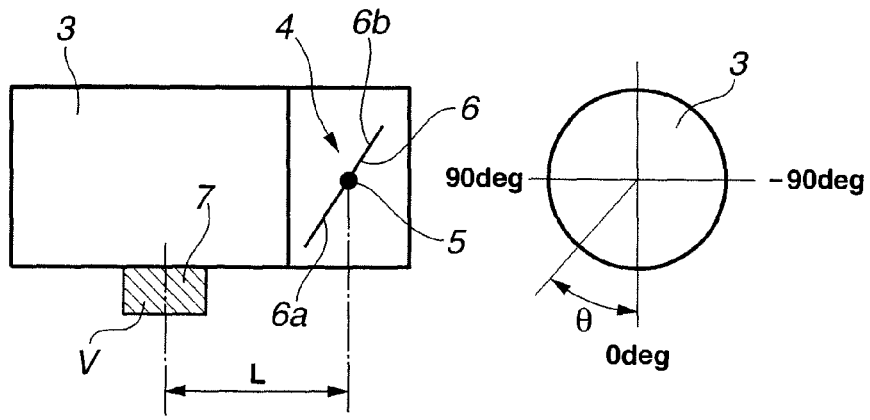
FIG. 3 is a view for illustrating comparison between an intake apparatus of a comparative example and the intake apparatus according to the embodiment of the present invention, when parameters of the expansion chamber are varied.
FIGS. 4A and 4B are views for illustrating the parameters.
Figure 5:
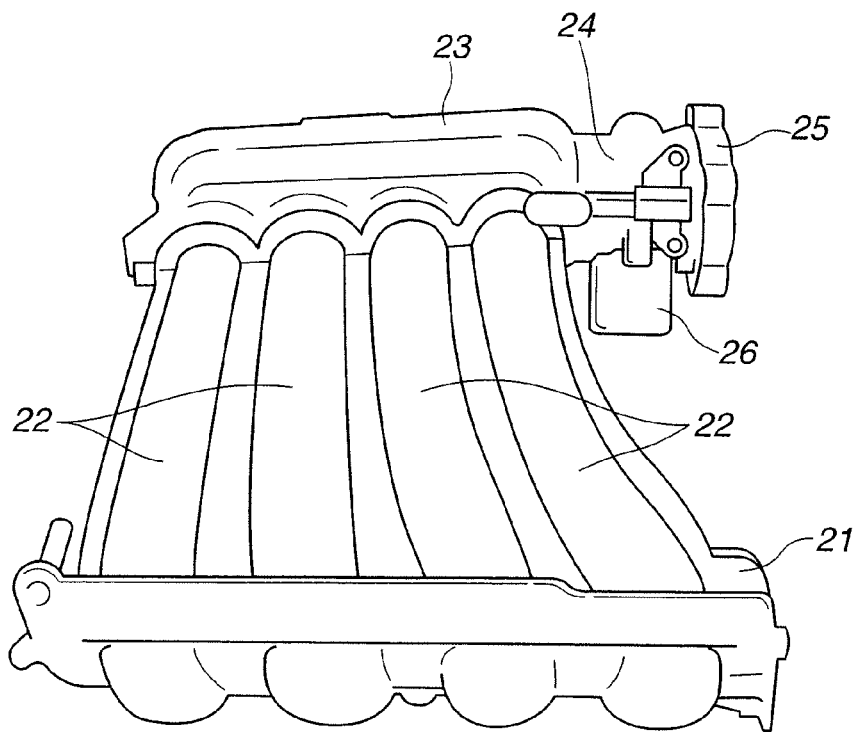
FIG. 5 is a plan view showing an intake manifold made from a synthetic resin, according to a second lo embodiment of the present invention.
Figure 6:
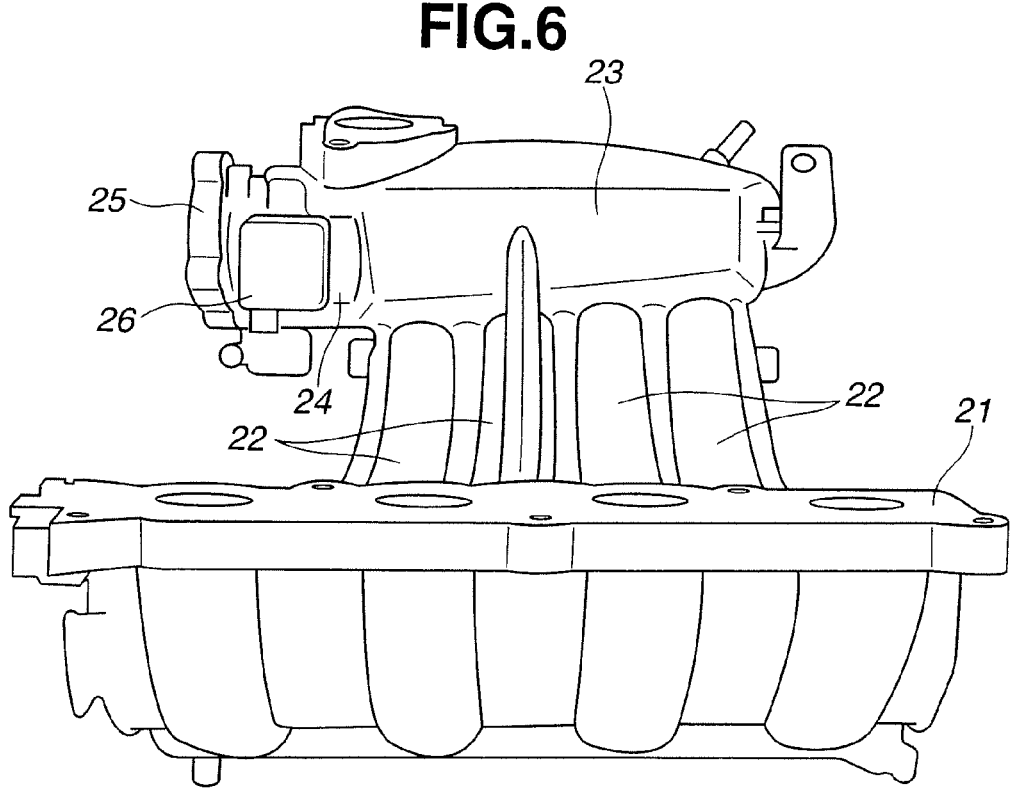
FIG. 6 is a bottom view showing the intake manifold of FIG. 5.
Figure 7:
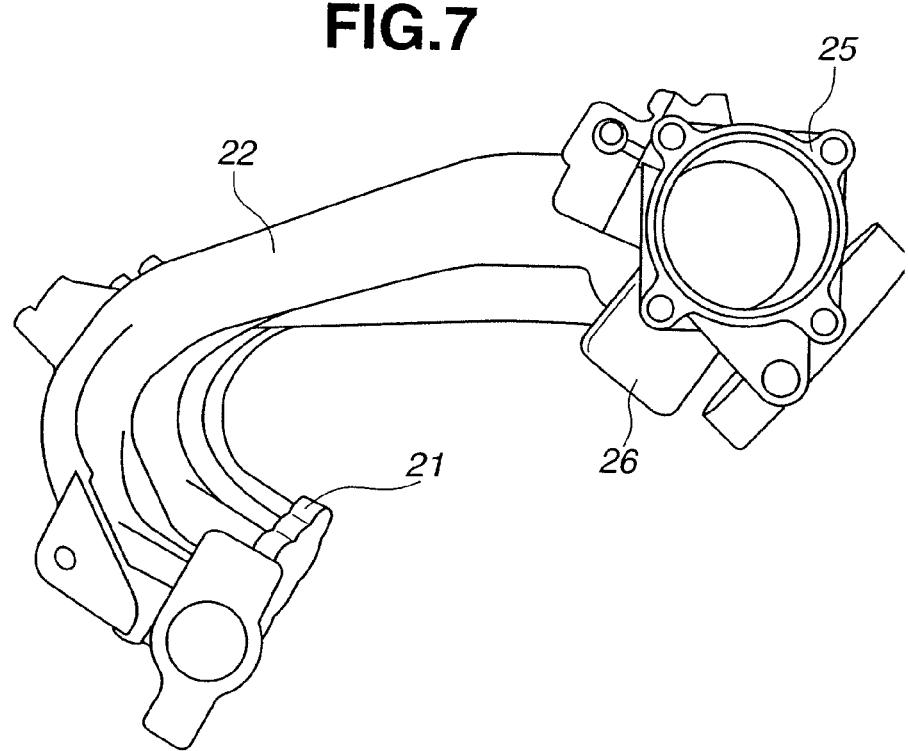
FIG. 7 is a side view showing the intake manifold of FIG. 5.
Figure 8:
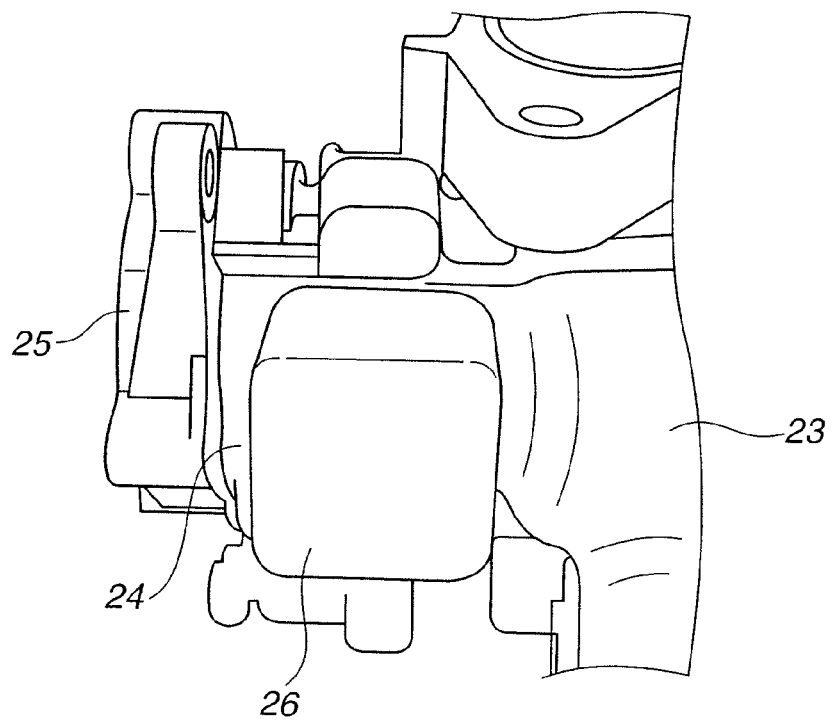
FIG. 8 is an enlarged view showing a main part of the intake manifold of FIG. 6.

FIG. 3 is a table for illustrating effects of parameters such as the position and the size of expansion chamber 7, in case of an intake apparatus of an inline four-cylinder gasoline engine of 2000 cc displacement which can be employed for the intake apparatus of the illustrated embodiment. The noise when throttle valve 4 is moved from the fully closed position to the fully open position is measured by a microphone which is disposed above throttle valve 4. A sound pressure difference designates a difference with respect to a noise in a case in which expansion chamber 7 is not provided. Accordingly, minus (−) means the reduction of the noise, and plus (+) means the increase (deterioration) of the noise.

A distance L designates a distance (in a longitudinal direction) from rotation shaft 5 of throttle valve 4 to a center of expansion chamber 7. As shown in FIG. 4B, an angle θ designates a circumferential position of the central position of expansion chamber 7 in the section of the intake passage as viewed from a right side of FIG. 4A. In particular, position of first end 6a of valve element 6 (lowest position) is represented by 0 degree. Angle θ is measured from the position of first end 6a of valve element 6. Accordingly, the directions of 90 degrees and −90 degrees are an axial direction of rotation shaft 5. A volume V designates a volume of expansion chamber 7. In this example, expansion chamber 7 is in the form of a rectangular shape.

In the embodiment of the present invention (shown as EXAMPLE in FIG. 3), distance L is 80 mm, angle θ is 45 degrees, and volume V is 15 cc. Under these appropriate parameters, the effect of the reduction of the abnormal noise of 3.4 dB is (was) attained.

In a comparative example 1, distance L is shortened to 60 mm, that is, expansion chamber 7 is disposed closer to throttle valve 4, relative to the embodiment of the present invention. In this case, the noise of the air flow is deteriorated (increased) by 0.5 dB. That is, in the case in which expansion chamber 7 is disposed extremely closer to throttle valve 4, the effect of the reduction of the noise is not attained, and adversely the noise is deteriorated (increased). In a comparative example 2, distance L is lengthened to 100 mm, that is, expansion chamber 7 is disposed away from throttle valve 4. In this case, the effect of the noise of the air flow is decreased to 1.7 dB. By the comparison among the embodiment and the comparative examples 1 and 2, it is understood that there is an appropriate range of distance L in the longitudinal direction.

In comparative examples 3 and 4, angles θ are is different from angle θ of the embodiment of the present invention, and angle θ specifies (determines) the circumferential position that expansion chamber 7 is formed. In comparative example 3, angle θ is 90 degree, that is, expansion chamber 7 is provided in a direction along rotation shaft 5. In this case, the noise is not varied. That is, the effect of the reduction of the noise is not attained by expansion chamber 7. In comparative example 4, angle θ is 0 degree, that is, expansion chamber 7 is provided in a direction that first end 6a of valve element 6 is positioned. In this case, the noise of the air flow is deteriorated (increased) by 1.4 dB. In this way, the effect of the reduction of the noise is attained in the vicinity of 45 degrees.

In comparative examples 5 and 6, volumes V of expansion chamber 7 are different from volume V of the embodiment of the present invention. In the comparative examples 5 and 6, volumes V are varied by varying depths (dimensions in the radial direction of the intake passage) of expansion chamber 7, without varying shapes of openings of expansion chamber 7 which confront the intake passage. In comparative example 5, volume V is 5 cc, and the effect of the reduction of the noise is 2.9 dB. In comparative example 6, volume V is 300 cc, and the effect of the reduction of the noise is 3.2 dB. Accordingly, it is understood that the size of the volume hardly affect the effect of the reduction of the noise.

Next, FIGS. 5~8 show an intake manifold according to a second embodiment of the present invention. This intake manifold is made from a synthetic resin for an inline four-cylinder gasoline engine. This intake manifold includes a cylinder head mounting flange 21 mounted to a side surface of the cylinder head; four branch portions 22 each including a first end portion connected with cylinder head mounting flange 21, and a second end portion; a collector portion 23 which is in the form of an enlarged volume chamber, and which is connected with the second end portions of four branch portions 22; a cylindrical passage portion (or tubular portion) 24 extending from one end of collector portion 23 in a longitudinal direction of collector portion 23; and a throttle chamber mounting flange 25 which is in the form of a substantially square shape, and which is provided at one end of passage portion 24. A throttle chamber (not shown) provided with a throttle valve is mounted to throttle chamber mounting flange 25. An intake passage within the throttle chamber is opened and closed by the throttle valve, and continuously connected with an intake passage of passage portion 24 (in a stepless manner). Branch portions 22 extend upwards from cylinder head mounting flange 21 mounted to the side surface of the cylinder head, and extend above and across the cylinder head. Branch portions 22 is in the form of a curved shape. Collector portion 23 extends along the direction of the cylinder row, in the form of the enlarged shape. Similarly, a flow central lo line of passage portion 24 extends along the direction of the cylinder row. A flange surface of throttle chamber mounting flange 25 is perpendicular to the flow central line of passage portion 24. Accordingly, the throttle chamber and passage portion 24 are disposed in the same straight line.

An expansion chamber 26 is integrally formed in a part of a circumferential wall of passage portion 24, and is recessed radially outwards. This expansion chamber 26 is in the form of a simple rectangular shape. When passage portion 24 is formed into halved shape by injection molding, expansion chamber 26 is concurrently formed by a mold of the injection molding. The depth direction of expansion chamber 26 is aligned with a direction of molding opening of mold, and accordingly it is possible to integrally form expansion chamber 26 by the metal molding, without using complicated cores and so on.

Besides, the throttle valve is not shown in FIGS. 5~8, and however expansion chamber 26 is provided in a predetermined direction that is inclined at 45 degrees to the rotation shaft of the throttle valve, and at a position which is away from the rotation shaft of the throttle valve in the downward direction by a predetermined distance.

In the embodiment of the present invention, expansion chamber 26 is merely formed in the intake manifold made from the synthetic resin, and accordingly it is possible to effectively decrease the noise of the air flow when the throttle valve is rapidly opened. Moreover, another component become unnecessary, and it is possible to decrease the number of the components, and to decrease man-hour of the assembly operation.

The intake apparatus according to the embodiment of the present invention includes a passage section defining an intake passage; and a throttle valve located in the intake passage, the throttle valve including a rotation shaft, and a plate-shaped valve element arranged to rotate about the rotation shaft, and having a first end and a second end, the throttle valve being opened so that the first end of the valve element is moved in a downstream direction of the intake passage, and that the second end of the valve element is moved in an upstream direction of the intake passage. The passage section includes a circumferential wall formed with an expansion chamber recessed radially outwards, the expansion chamber extending partially circumferentially, and being located at a longitudinal position, that is downstream of the throttle valve, and that intake air flows passing through the first and second ends of the valve element flow into each other.

In the intake apparatus according to the embodiment of the present invention, the expansion chamber is provided in a part of the circumferential wall of the passage section, and located at a circumferential position which is closer to the first end of the valve element than to the second end of the valve element. The expansion chamber is provided at the circumferential position which is located in a direction inclined at 45° to the rotation shaft from a center of the intake passage.

In the intake apparatus according to the embodiment of the present invention, the expansion chamber is provided at the circumferential position other than a circumferential position which is located in a direction along the rotation shaft, and a circumferential position which is located in a direction perpendicular to the rotation shaft.

The intake manifold according to the embodiment of the present invention includes a collector portion connected with a plurality of branch portions; a throttle chamber mounting flange to which a throttle chamber provided with a throttle valve is mounted; and a cylindrical passage portion connecting the throttle chamber mounting portion and the collector portion, and including a circumferential wall having an expansion chamber extending partially circumferentially, the expansion chamber being integrally formed with the passage portion, and recessed radially outwards.

The noise of the air flow when the throttle valve is suddenly opened is caused by the local pressure increase caused by the joining of the high speed air flow passing through the first end of the valve element and the high speed air flow passing through the second end of the valve element immediately downstream of the throttle valve. Accordingly, the expansion chamber is provided at the position that the local pressure increase is generated, and the pressure energy is diffused. Hence, it is possible to inhibit the generation of the abnormal noise. Besides, there is the appropriate position in the longitudinal direction of the intake passage for providing the expansion chamber in accordance with the diameter of the throttle valve and so on. In a case in which the expansion chamber is located at an extremely downstream position (that is, large distance from the throttle valve), the effect is small. Moreover, in a case in which the expansion chamber is located at an extremely upstream position (that is, small distance from the throttle valve), conversely the noise may be increased.

Moreover, in the section of the intake passage, the local pressure increase is caused at the position on the first end's side that the first end is moved in the downstream direction at the open operation, for the inclination of the valve element. Therefore, the expansion chamber is formed at the circumferential position which is located on the first end's side, and which is located in the direction inclined at 45° to the rotation shaft from the center of the intake passage. Accordingly, it is possible to effectively attain the effect of the reduction of the noise.

In the intake apparatus according to the embodiment of the present invention, the grid-shaped rectifier member and the protrusion are not provided in the intake passage that the intake air flows. Accordingly, the pressure loss (that is, the resistance of the air flow) is not increased.

In the case of the intake manifold made from the synthetic resin, the expansion chamber can be formed by partially recessing the part of the circumferential wall of the passage portion. Accordingly, it is possible to integrally form the expansion chamber as part of the manifold.

In the example of the present invention, it is possible to suppress the abnormal noise of the air flow when the throttle valve is suddenly opened, without increasing the resistance of the air flow of the intake system. Moreover, the grid-shaped rectifier member of the different component is not used to form the simple structure. It is possible to decrease the number of the components, and to simplify the assembly operation, by integrally forming the manifold made from the synthetic resin and the expansion chamber.

This application is based on a prior Japanese Patent Application No. 2006-049607. The entire contents of the Japanese Patent Application No. 2006-049607 with a filing date of Feb. 27, 2006 are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. An intake apparatus for an internal combustion engine, comprising:
   a passage section defining an intake passage; and
   a throttle valve located in the intake passage, the throttle valve including a rotation shaft, and a plate-shaped valve element arranged to rotate about the rotation shaft, and having a first end and a second end, the throttle valve being opened so that the first end of the valve element is moved in a downstream direction of the intake passage, and that the second end of the valve element is moved in an upstream direction of the intake passage,
   the passage section including a circumferential wall formed with an expansion chamber recessed radially outwards, the expansion chamber extending partially circumferentially, and being located at a longitudinal position that is downstream of the throttle valve, and that intake air flows passing through the first and second ends of the valve element flow into each other,
   wherein the expansion chamber is provided in a part of the circumferential wall of the passage section, and located at a circumferential position which is closer to the first end of the valve element than to the second end of the valve element; and
   wherein the expansion chamber is provided at the circumferential position which is located in a direction inclined at 45° to the rotation shaft from a center of the intake passage.

2. An intake apparatus for an internal combustion engine, comprising:
   a passage section defining an intake passage; and
   a throttle valve located in the intake passage, the throttle valve including a rotation shaft, and a plate-shaped valve element arranged to rotate about the rotation shaft, and having a first end and a second end, the throttle valve being opened so that the first end of the valve element is moved in a downstream direction of the intake passage, and that the second end of the valve element is moved in an upstream direction of the intake passage,
   the passage section including a circumferential wall formed with an expansion chamber recessed radially outwards, the expansion chamber extending partially circumferentially, and being located at a longitudinal position that is downstream of the throttle valve, and that intake air flows passing through the first and second ends of the valve element flow into each other,
   wherein the expansion chamber is provided in a part of the circumferential wall of the passage section, and located at a circumferential position which is closer to the first end of the valve element than to the second end of the valve element; and
   wherein the expansion chamber is provided at the circumferential position other than a circumferential position which is located in a direction along the rotation shaft, and a circumferential position which is located in a direction perpendicular to the rotation shaft.

3. The intake apparatus as claimed in claim 2, wherein the expansion chamber is integrally formed with the passage section.

4. An intake manifold made from a synthetic resin for an internal combustion engine, the intake manifold comprising:
   a collector portion connected with a plurality of branch portions;
   a throttle chamber mounting flange to which a throttle chamber provided with a throttle valve is mounted, the throttle valve including a rotation shaft, and a plate-shaped valve element arranged to rotate about the rotation shaft, and having a first end and a second end; and
   a cylindrical passage portion connecting the throttle chamber mounting flange and the collector portion, and including a circumferential wall having an expansion chamber extending partially circumferentially, the expansion chamber being integrally formed with the passage portion, and recessed radially outwards,
   wherein the expansion chamber is provided in a part of the circumferential wall of the passage portion, and located at a circumferential position which is closer to the first end of the valve element than to the second end of the valve element; and
   wherein the expansion chamber is provided at the circumferential position other than a circumferential position which is located in a direction along the rotation shaft, and a circumferential position which is located in a direction perpendicular to the rotation shaft.

* * * * *